US006006409A

United States Patent [19]

Paschke

[11] Patent Number: 6,006,409

[45] Date of Patent: Dec. 28, 1999

[54] CLAMPING AND SEPARATING DEVICE, ESPECIALLY FOR PULLING OFF BEARING SHELLS

[76] Inventor: Uwe Paschke, Am hohen Holze 12 A, D-30974 Wennigsen, Germany

[21] Appl. No.: 09/206,006

[22] Filed: Dec. 4, 1998

[30] Foreign Application Priority Data

Feb. 19, 1998 [DE] Germany ............................ 198 06 965

[51] Int. Cl.$^{6}$ ........................................................ B23P 19/04

[52] U.S. Cl. ............................. 29/239; 269/210; 269/268

[58] Field of Search ............................... 29/239; 269/210, 269/243, 268, 215

[56] References Cited

U.S. PATENT DOCUMENTS 1,349,225 8/1920 Rosenblum ............................. 269/215

*Primary Examiner*—Timothy V. Eley
*Assistant Examiner*—Benjamin M. Halpern
*Attorney, Agent, or Firm*—Robery W. Becker & Associates

[57] ABSTRACT

A clamping and separating device for removal of bearing shells has first and second jaws and at least one bolt inserted in an insertion direction into the first and second jaws for clamping the first and second jaws relative to one another. The bolt has depressions arranged in a longitudinal direction of the bolt and spaced relative to one another in the longitudinal direction. A locking element is mounted in the first jaw and selectively engages in a locking position one of the depressions for locking the bolt. A spring biases the locking element in a direction counter to the insertion direction into a rest position. The locking element is releaseable from the locking position against the force of the spring to allow removal of the bolt in a direction counter to the insertion direction.

15 Claims, 1 Drawing Sheet

CLAMPING AND SEPARATING DEVICE, ESPECIALLY FOR PULLING OFF BEARING SHELLS

BACKGROUND OF THE INVENTION

The present invention relates to a clamping or separating device, especially for pulling off bearing shells, with two jaws that are clamped relative to one another by at least one threaded clamping bolt.

Since these devices, in general, are designed for use with the jaws being placed at greatly varying spacings to one another, correspondingly large threaded bolts are needed. It is understood that correspondingly long threaded portions must be provided in order to be able to place the nuts corresponding to the threaded bolts onto the back side of the jaws. Furthermore, the adjustment of the nuts, respectively, their adaptation to the different widths of the opening of the jaws requires a considerable amount of time.

It is therefore an object of the present invention to embody devices of the aforementioned kind such that the devices can be quickly adjusted to the required width of the workpiece, but can also be removed quickly whereby also the time expenditure for tightening the nuts should be considerably reduced.

SUMMARY OF THE INVENTION

As a solution to this object it is inventively suggested that the threaded bolt is provided with a plurality of depressions arranged over its axial length one after another whereby a locking element provided at one of the jaws will engage one of the depressions. Expediently, these depressions are embodied as rounded notches while the locking element is preferably in the form of a nose that can selectively engage one of the notches.

This allows for the possibility to adjust the jaws in a stepwise manner and to subsequently to tighten the nuts of the threaded bolts which are now in an approximate effective position in order to thus clamp the two jaws relative to one another whereby, for example, a bearing shell is to be engaged and to be removed by additional tie-rods.

Expediently, the depressions are designed such that they extend only over a portion of the circumference of the threaded bolt. When under these conditions the locking element is supported in an elastically yielding manner, the fixation of the threaded bolts by the locking element in the area of a respective depression of the threaded bolt can be canceled by rotation of the threaded bolt about its longitudinal axis and the threaded bolt can then be longitudinally moved without being hindered by the depressions which could cause arresting or locking of the bolt.

Preferably, the elastically yielding support of the locking element is provided by a rotary support action in connection with a spring which counteracts the rotation of the locking element in one rotary direction in an elastic manner. This support action is advantageous because the locking element, respectively, its holder is embodied with a rounded outer surface and can thus be supported in a (cylindrical) bore which can be embodied as a blind bore.

The jaws of the device can also be provided with means, for example, in the form of threaded holes, in order to provide attachment locations for tie rods or similar tie elements. It is thus possible to employ the clamping or separating device advantageously also as a pull-off device.

BRIEF DESCRIPTION OF THE DRAWINGS

The object and advantages of the present invention will appear more clearly from the following specification in conjunction with accompanying drawings, in which.

DESCRIPTION OF PREFERRED EMBODIMENTS

Figure 1:
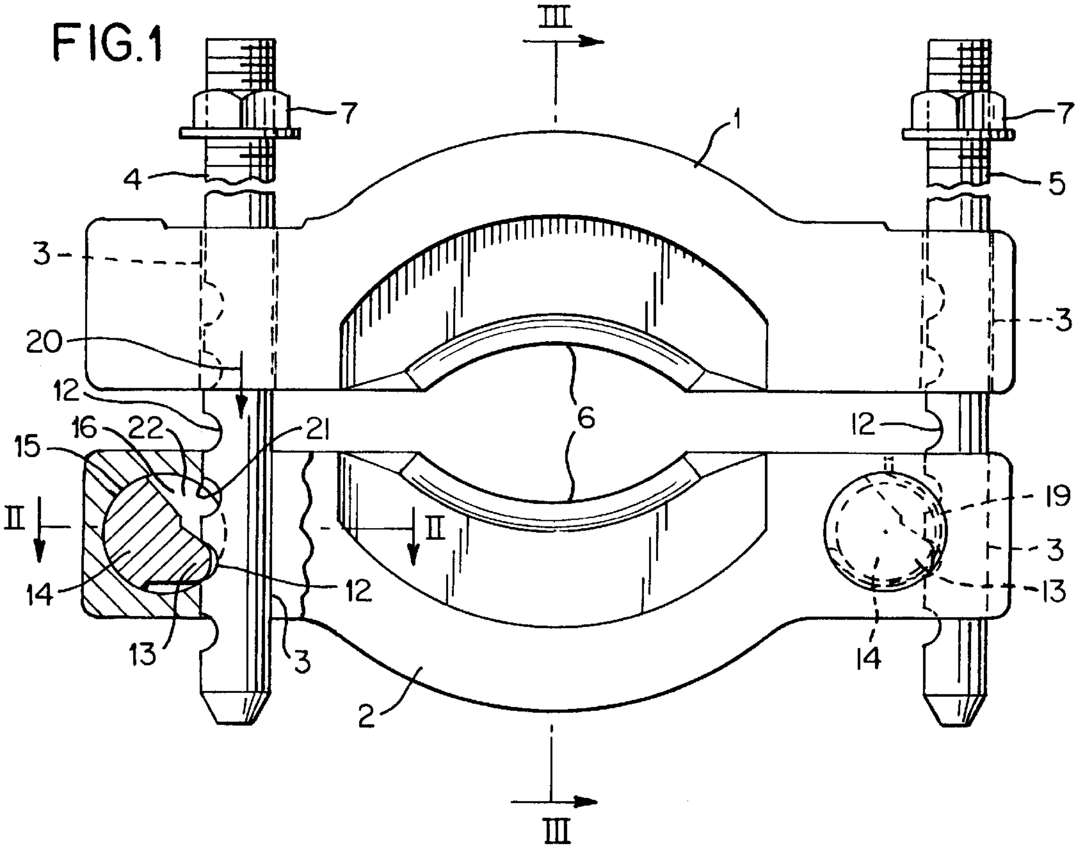
FIG. 1 shows a separating device for pulling bearing shells off axles or shafts, illustrating the locking element in its locking position.

The present invention will now be described in detail with the aid of several specific embodiments utilizing FIGS. 1–3.

The separating device is comprised substantially of two clampable jaws 1, 2 which are arranged in a yoke-like manner and each have at both ends bores 3, 4 receiving threaded clamping bolts 4, 5. The spacing of the two jaws 1, 2 at their facing sides provided with edges 6 can be changed, especially reduced for the purpose of separating machine elements by clamping (tightening) the two jaws 1, 2, whereby the nuts 7 of the threaded bolts 4, 5 are tightened.

Figure 3:
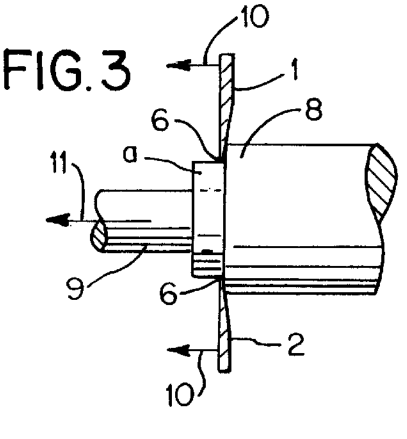
FIG. 3 shows a part-sectional view along the line III—III of FIG. 1 whereby the device is shown schematically in its active position.

Such a process is schematically illustrated in FIG. 3. The two jaws 1, 2 engage the gap between a bearing shell a and a projection 8 of a shaft or axle 9 and thus provide for the desired separation of the bearing shell from its seat. The two jaws 1, 2 can then be removed together with the bearing shell a by employing tie rod 10 and pulling in the direction of arrow 11.

In order to be able to adjust the jaws 1, 2 in a stepwise manner and to clamp the jaws relative to one another within the step ranges by using the nuts 7, the threaded bolts 4, 5 are provided with a plurality of rounded depressions 12 which are arranged in the axial or longitudinal direction of the bolts adjacent to one another. A locking element 13 with a rounded nose can engage these depressions 12, whereby the locking element 13 is connected to the outer cylindrical wall of a holder 14. The holder 14 is, rotatably supported in a cylindrical blind bore 15. The outer circumference is supported at the inner surface of the blind bore 15 and the two opposed end faces are secured, on the one hand, by the bottom 16 of the bore and, on the other hand, by a spring ring 17. The spring ring 17 protects the holder 14 from falling out of the bore 15. Both end faces of the holder 14 have circumferential projections 18 for supporting the two end faces of the holder 14.

Figure 2:
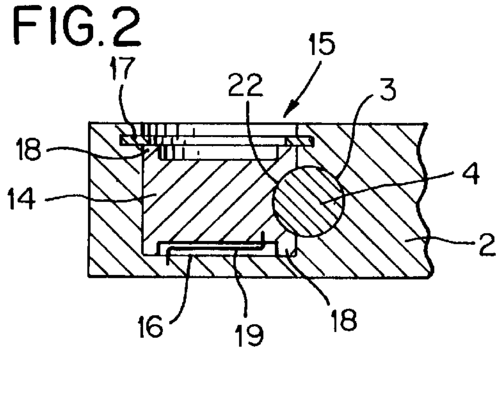
FIG. 2 shows a schematic section along the line II—II of FIG. 1, whereby, in contrast to FIG. 1, the locking element is in its released position.

A spring 19 acts on the holder 14 in a direction counter to the insertion direction 20 of the two threaded bolts 4, 5 such that in its released position the nose 13 is rotated by 90° relative to the position shown in FIG. 1, whereby the tip of the nose 13 is arranged approximately in the vicinity of the location indicated by reference numeral 21.

It should be noted that the force of the spring 19 can be overcome by rotation of the holder 14 when the threaded bolts 4, 5 are inserted in the direction of arrow 20. In the opposite direction, however, each one of the depressions 12 provides a locking action for the threaded bolts 4, 5.

In order to be able to move the threaded bolts 4, 5 counter to the insertion direction 20, the holder 14 has a recess 22 positioned behind the nose 13 and acting as follows. For removal of the threaded bolts 4, 5 they are rotated about their longitudinal axis such that the cylindrical outer surface of the bolts 4, 5 free of depressions 12 are positioned opposite the holder 14. This rotation of the threaded bolts 4, 5 is possible since the holder 14 can be rotated against the spring force to such an extent that the operational state according to FIG. 2 is reached. The recess 22 allows then an axial movement of the threaded bolts 4, 5 without hindrance by the depressions 12.

With a counter rotation of the threaded bolts 4, 5, the depressions 12 are again placed opposite the nose 13 so that the locking position according to FIG. 1 can then again be reached.

As explained above, the device can first be adjusted in a step-wise manner to the desired jaw spacing. The force action for clamping and the actual separation step can then be preformed by tightening the nuts 7.

The invention can optionally also be used with jaw pairs which are connected at one end by a joint wherein the opposite ends are then connected by the threaded clamping bolt.

It should be noted that the arms extending on both sides of the edges 6 and provided with the bolts 3 can have different lengths. For example, in most cases it is favorable, as shown in FIG. 1, to have each jaw 1, 2 provided with one arm that is longer than the other.

The free ends of the threaded bolts 4, 5 are conical, i.e., they taper. This ensures that the insertion of the threaded bolt 4, 5 in the direction of arrow 20 will displace the locking element 13 by rotation of the holder 14.

The support of the holder 14 in its bore 15 has the advantage of simple manufacture. Furthermore, the holder 14, in contrast to FIG. 2, can be designed such that the outer surface of the holder 14 is flush with the neighboring surfaces of the jaws 1, 2.

Since the depressions 12 aligned in the longitudinal direction of the threaded bolts 4, 5 extend only over a portion of the circumference of the bolts, preferably about one quarter to one third of the circumference, the threaded bolts 4, 5 are secured against rotation when the locking elements 13 are in engagement within the depressions so that the nuts 7 can be tightened. Thus, a positive-locking action between the locking element 13 and the nuts 4, 5 is provided.

The specification incorporates by reference the disclosure of German priority document 198 06 965.0 of Feb. 19, 1998.

The present invention is, of course, in no way restricted to the specific disclosure of the specification and drawings, but also encompasses any modifications within the scope of the appended claims.

What is claimed is:

1. A clamping and separating device for removal of bearing shells, said device comprising:

first and second jaws (1, 2);

at least one bolt (4, 5) inserted in an insertion direction (20) into said first and second jaws (1, 2) for clamping said first and second jaws (1, 2) relative to one another;

said bolt (4, 5) having depressions (12) arranged in a longitudinal direction of said bolt (4, 5) and spaced relative to one another in said longitudinal direction;

a locking element (13) mounted in said first jaw (2) and selectively engaging in a locking position one of said depressions (12) for locking said bolt (4, 5);

a holder (14);

said first jaw (2) having a cylindrical bore (15) in which said holder (14) is rotatably arranged;

said locking element (13) connected to said holder (14);

a spring (19) biasing said locking element (13) in a direction counter to said insertion direction (20) into a rest position;

said locking element (13) releasable from said locking position against the force of said spring (19) to allow removal of said bolt (4, 5) in a direction counter to said insertion direction (20).

2. A device according to claim 1, wherein said bore is a blind bore (15).

3. A clamping and separating device for removal of bearing shells, said device comprising:

first and second jaws (1, 2);

at least one bolt (4, 5) inserted in an insertion direction (20) into said first and second jaws (1, 2) for clamping said first and second jaws (1, 2) relative to one another;

said bolt (4, 5) having depressions (12) arranged in a longitudinal direction of said bolt (4, 5) and spaced relative to one another in said longitudinal direction;

a locking element (13) having a holder (14) mounted in said first jaw (2), said locking element (13) selectively engaging in a locking position one of said depressions (12) for locking said bolt (4, 5);

a spring (19) biasing said locking element (13) in a direction counter to said insertion direction (20) into a rest position;

said locking element (13) releasable from said locking position against the force of said spring (19) to allow removal of said bolt (4, 5) in a direction counter to said insertion direction (20);

wherein said holder has a recess (22) arranged in said insertion direction (20) before said locking element (13), wherein said recess (22) allows said bolt (4, 5) to act on said locking element (13) and push said locking element (13) aside to allow unhindered insertion of said bolt (4, 5).

4. A device according to claim 3, wherein said first jaw (2) has a cylindrical bore (15) in which said holder (14) is rotatably arranged.

5. A device according to claim 3, wherein said bolt (4, 5) has a longitudinal axis and is rotatable about said longitudinal axis into a removal position in which said depressions (12) face away from said locking element (13) and said bolt (4, 5) is removable counter to said insertion direction (20).

6. A device according to claim 3, wherein said bolt (4, 5) has a leading end in said insertion direction and wherein said leading end is tapered.

7. A device according to claim 1, wherein said bore (15) has a bottom (16) and an opening, wherein said holder (14) rests at said bottom (16) and wherein said holder (14) is secured in the vicinity of said opening by a securing means (17).

8. A device according to claim 7, wherein said securing means (17) is a spring ring (17).

9. A device according to claim 1, wherein said locking element (13) has a rounded nose for engaging said depressions (12).

10. A device according to claim 1, wherein each one of said depressions (12) is rounded and extends only over a circumferential portion of said bolt (4, 5).

11. A device according to claim 1, wherein a spring force of said spring (19) is such that said locking element (13) in said locking position loads said bolt (4, 5).

12. A clamping and separating device for removal of bearing shells, said device comprising:

first and second jaws (1, 2);

at least one bolt (4, 5) inserted in an insertion direction (20) into said first and second jaws (1, 2) for clamping said first and second jaws (1, 2) relative to one another;

said bolt (4, 5) having depressions (12) arranged in a longitudinal direction of said bolt (4, 5) and spaced relative to one another in said longitudinal direction;

a locking element (13) having a holder (14) mounted in said first jaw (2), said locking element (13) selectively engaging in a locking position one of said depressions (12) for locking said bolt (4, 5);

a spring (19) biasing said locking element (13) in a direction counter to said insertion direction (20) into a rest position;

said locking element (13) releasable from said locking position against the force of said spring (19) to allow removal of said bolt (4, 5) in a direction counter to said insertion direction (20);

wherein said spring (19) is a rotary spring acting on said holder (14) and said locking element (13), wherein said rotary spring (19) has a rotary tensioning path until reaching an active position that matches substantially a rotation of said holder (14) by 90°.

13. A device according to claim 1, wherein said first and second jaws (1, 2) have connecting points for a tie rod (10) and wherein said device is a pulling-off device.

14. A device according to claim 1, wherein two of said bolts (4, 5) are provided on opposed ends of said first and second jaws (1, 2) and wherein the active jaw members (6) of said first and second jaws (1, 2) are off-center relative to said bolts (4, 5).

15. A device according to claim 1, wherein said depressions (12) extend only over a circumferential portion of said bolt (4, 5) such that when said locking element (13) is in said locking position said bolt (4, 5) is secured against rotation.

* * * * *